United States Patent [19]
Townsend et al.

[11] Patent Number: 5,291,532
[45] Date of Patent: Mar. 1, 1994

[54] FUEL TRANSFER SYSTEM

[75] Inventors: Harold E. Townsend, Campbell; Giancarlo Barbanti, Cupertino, both of Calif.

[73] Assignee: General Electric Company, San Jose, Calif.

[21] Appl. No.: 834,947

[22] Filed: Feb. 14, 1992

[51] Int. Cl.$^5$ .............................................. G21C 19/18
[52] U.S. Cl. .................................. 376/269; 376/268; 376/270
[58] Field of Search ............... 376/261, 264, 268, 269, 376/270, 271

[56] References Cited

U.S. PATENT DOCUMENTS

| | | | |
|---|---|---|---|
| 3,883,012 | 5/1975 | Jones | 376/264 |
| 3,910,006 | 10/1975 | James | 376/272 |
| 4,511,531 | 4/1985 | Swidwa et al. | 376/271 |
| 4,749,541 | 6/1988 | Hardin, Jr. et al. | 376/261 |
| 5,019,327 | 5/1991 | Fanning et al. | 376/269 |

FOREIGN PATENT DOCUMENTS 2431752  2/1980  France .

OTHER PUBLICATIONS

Patent Abstracts of Japan, vol. 15, No. 24 (P-1156) Jan. 21, 1991 JP-02 268 297 (Toshiba Corp.) Nov. 1, 1990 (Abstract).

General Electric Company, "BWR/6 General Description of a Boiling Water Reactor," revised Sep. 1980, Title and Notice sheets and pp. 3-6 to 3-8, 4-2 to 4-4, 7-1 to 7-6, and 9-1 to 9-8.

Primary Examiner—Daniel D. Wasil
Attorney, Agent, or Firm—J. S. Beulick

[57] ABSTRACT

A nuclear fuel bundle fuel transfer system includes a transfer pool containing water at a level above a reactor core. A fuel transfer machine therein includes a carriage disposed in the transfer pool and under the water for transporting fuel bundles. The carriage is selectively movable through the water in the transfer pool and individual fuel bundles are carried vertically in the carriage. In a preferred embodiment, a first movable bridge is disposed over an upper pool containing the reactor core, and a second movable bridge is disposed over a fuel storage pool, with the transfer pool being disposed therebetween. A fuel bundle may be moved by the first bridge from the reactor core and loaded into the carriage which transports the fuel bundle to the second bridge which picks up the fuel bundle and carries it to the fuel storage pool.

18 Claims, 6 Drawing Sheets

FUEL TRANSFER SYSTEM

The U.S. Government has rights in this invention in accordance with Contract No. DE-ACO3-90SF18494 awarded by the Department of Energy.

TECHNICAL FIELD

The present invention relates generally to nuclear reactors, and, more specifically, to a fuel transfer system for loading and unloading fuel from a nuclear reactor core.

BACKGROUND ART

In a conventional nuclear reactor such as a pressurized water reactor (PWR) or a boiling water reactor (BWR) a reactor core is contained in a pressure vessel. The core includes a plurality of transversely spaced apart elongate nuclear fuel bundles. Each of the fuel bundles typically includes an outer fuel or flow channel typically having a square transverse section. Disposed within the flow channel are a plurality of elongate fuel tubes spaced apart in a conventional square matrix. The bottom of the fuel bundle typically includes a hollow, conical nosepiece through which water is channeled upwardly through the fuel bundle wherein it is heated by conventional nuclear reactions within the fuel tubes. The top of the fuel bundle is open to allow the water to escape therefrom, and a handle is typically provided for lifting the fuel bundle into or from its position within the reactor core for fuel bundle loading or unloading.

More specifically, during a conventional refueling operation of the reactor core, about 25% or more of spent or burned fuel bundles within the reactor core are replaced with fresh fuel bundles. An upper pool of water is typically located above the reactor core for providing, for example, shielding of radiation from the fuel bundles, and a conventional bridge or gantry is movable over the pool for refueling the reactor core. The bridge includes a trolley mounted grapple which is telescopically extended downwardly through the pool and into the reactor core to grab one of the fuel bundles by its handle at the top thereof, and is then retracted upwardly to remove the fuel bundle. The fuel bundle is continuously maintained under the water to provide shielding thereof as well as for allowing water to flow upwardly through the fuel bundle to cool it. This prevents overheating due to the continuation of nuclear reactions therein which occur at a substantially reduced level than that occurring in an operating reactor core.

In a one bridge refueling system, each fuel bundle, or spent fuel bundle, is removed from the core and is translated one at a time horizontally through the upper pool to an adjacent fuel storage pool and placed vertically in a horizontal array of storage racks to be temporarily stored for up to several years until such spent fuel is then relocated to a long term storage site. A fresh fuel bundle is then transported by the bridge from the fuel storage pool back to the reactor core and positioned therein. Since a typical reactor includes several hundred fuel bundles, a substantial amount of time is required to remove the spent fuel bundles and replace them with fresh fuel bundles.

Furthermore, in a single bridge system, conventional fuel shipping casks which may weigh up to about 100 tons must be individually lifted into the fuel storage pool so that the spent fuel may be inserted therein. The lifting of such a heavy cask involves a risk that the cask may drop and damage the pool and/or the fuel bundles.

Another type of refueling system used in most PWRs and some BWRs uses two bridges with a transfer machine therebetween. One bridge carries fresh and spent fuel bundles individually between the reactor core and the transfer machine, and the other bridge transports spent and fresh fuel bundles between the transfer machine, and the fuel storage pool. The transfer machine then conveys the spent and fresh fuel bundles between the two bridges. In this way, an entire refueling operation may be carried out in less time than using a single bridge since the two bridges and transfer machine may be synchronized with all operating contemporaneously, with each separately carrying a respective fuel bundle therebetween. This system also eliminates the risk of dropping a shipping cask in the storage pool since one of the bridges may be used for transporting fuel between separate pools containing the stored fuel and the shipping casks.

In this two bridge system, the two bridges are typically located in separate buildings, one containing the reactor core, and another containing the fuel storage pool. The common wall between the two buildings must necessarily provide a seal for radiation and pressure between the two buildings and therefore requires a relatively complex transfer tube extending therebetween through which fuel bundles are transferred. The transfer tube is typically oriented either horizontally or inclined so that the passage between the two buildings is relatively small for reducing the complexity of the required seals therebetween. It is desirable to transport the fuel bundles primarily in an upright vertical orientation as they are moved laterally or sideways through the respective pools so that water may continually flow vertically upwardly therethrough for cooling the fuel bundles. The fuel bundles must, therefore, necessarily be temporarily upended or moved from their vertical orientation to the inclined or horizontal orientation for passage through the transfer tube. The conventional transfer machine therefore provides an upending device at each end of the transfer tube to initially rotate a vertical fuel bundle in the required horizontal inclination for passage through the transfer tube, and at the other end thereof another upending device then returns the fuel bundle to the preferred vertical orientation. Suitable seals are provided at both ends of the transfer tube to prevent leakage of the water therethrough.

Since spent fuel bundles have been operating for a considerable amount of time in the reactor core, radioactive corrosion debris is formed within the fuel bundles which is typically broken loose during the transport thereof and falls to the bottom of the respective pools. The radioactive corrosion debris will also fall during the upending operations and during travel through the transfer tube. The radioactive corrosion debris must be cleaned up from time to time which increases the maintenance time and cost in view of the complex transport path required with the two bridge and transfer tube system.

Furthermore, when the fuel bundles are inclined horizontally, natural convection cooling by the water being channeled therethrough is reduced since the vertical path therethrough has been reduced or eliminated. Accordingly, the fuel bundle must be transported relatively quickly through the transfer tube to reduce the likelihood of overheating of the fuel bundles, and additional procedures must be established to provide effective cooling thereof in the event of any failure of the transfer machine while the fuel bundles are upended.

OBJECTS OF THE INVENTION

Accordingly, one object of the present invention is to provide a new and improved fuel transfer system.

Another object of the present invention is to provide a fuel transfer system wherein fuel bundles may be continuously maintained in a vertical, upright position during the entire refueling operation.

Another object of the present invention is to provide a fuel transfer system including an independently operable fuel transfer machine and two bridges cooperating therewith for transferring fuel bundles between a reactor core and a fuel storage pool for increasing speed of refueling.

Another object of the present invention is to provide a fuel transfer system which may be readily disassembled for performing maintenance and which allows ready access within a water pool for cleaning up radiation corrosion debris.

DISCLOSURE OF INVENTION

A nuclear fuel bundle fuel transfer system includes a transfer pool containing water at a level above a reactor core. A fuel transfer machine therein includes a carriage disposed in the transfer pool and under the water for transporting fuel bundles. The carriage is selectively movable through the water in the transfer pool and individual fuel bundles are carried vertically in the carriage. In a preferred embodiment, a first movable bridge is disposed over an upper pool containing the reactor core, and a second movable bridge is disposed over a fuel storage pool, with the transfer pool being disposed therebetween. A fuel bundle may be moved by the first bridge from the reactor core and loaded into the carriage which transports the fuel bundle to the second bridge which picks up the fuel bundle and carries it to the fuel storage pool.

BRIEF DESCRIPTION OF DRAWINGS

The novel features believed characteristic of the invention are set forth and differentiated in the claims. The invention, in accordance with a preferred and exemplary embodiment, together with further objects and advantages thereof, is more particularly described in the following detailed description taken in conjunction with the accompanying drawings in which:

MODE(S) FOR CARRYING OUT THE INVENTION

Figure 1:
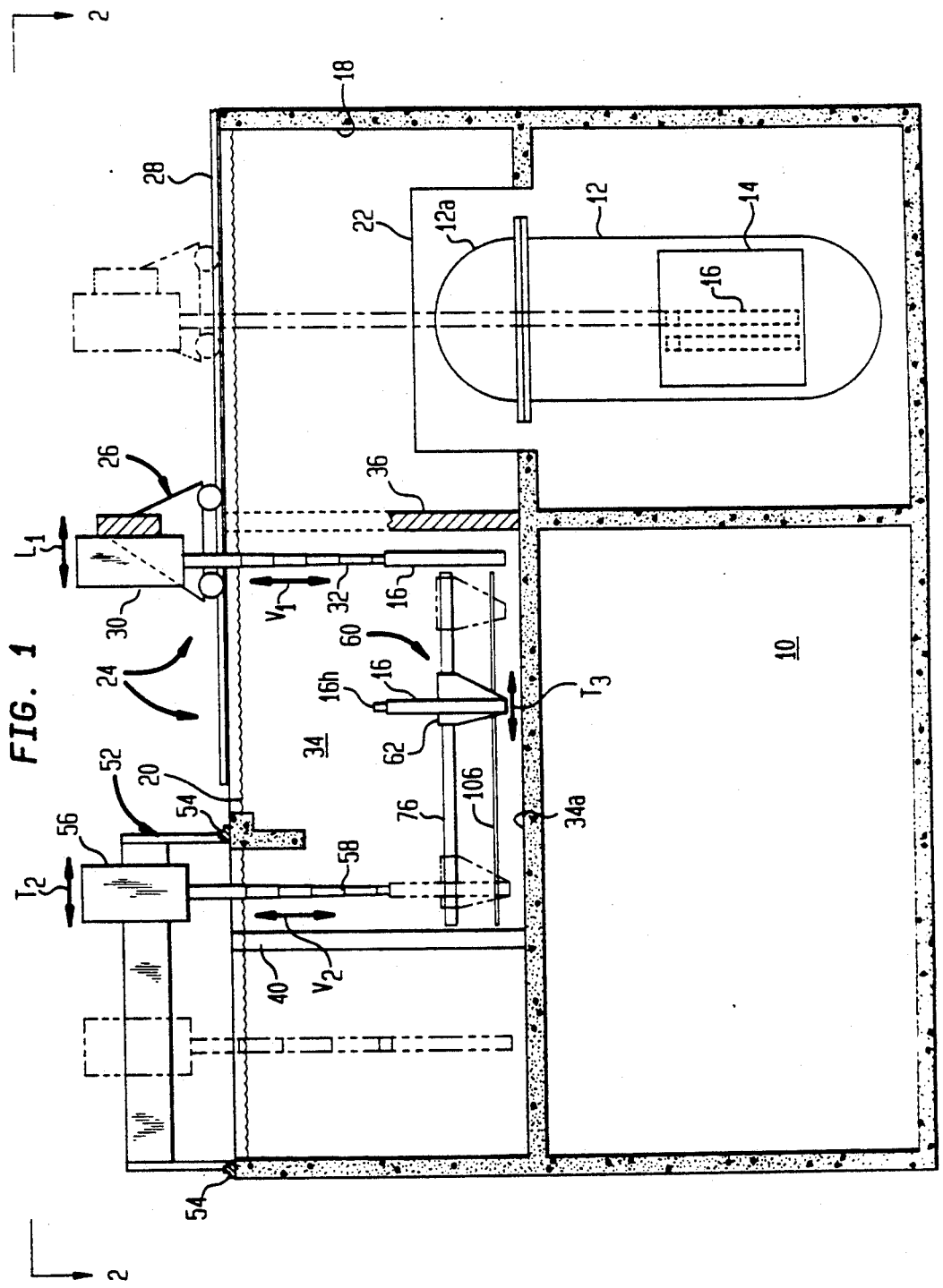
FIG. 1 is a schematic, elevation view of an exemplary fuel transfer system for a nuclear reactor core.
Figure 2:
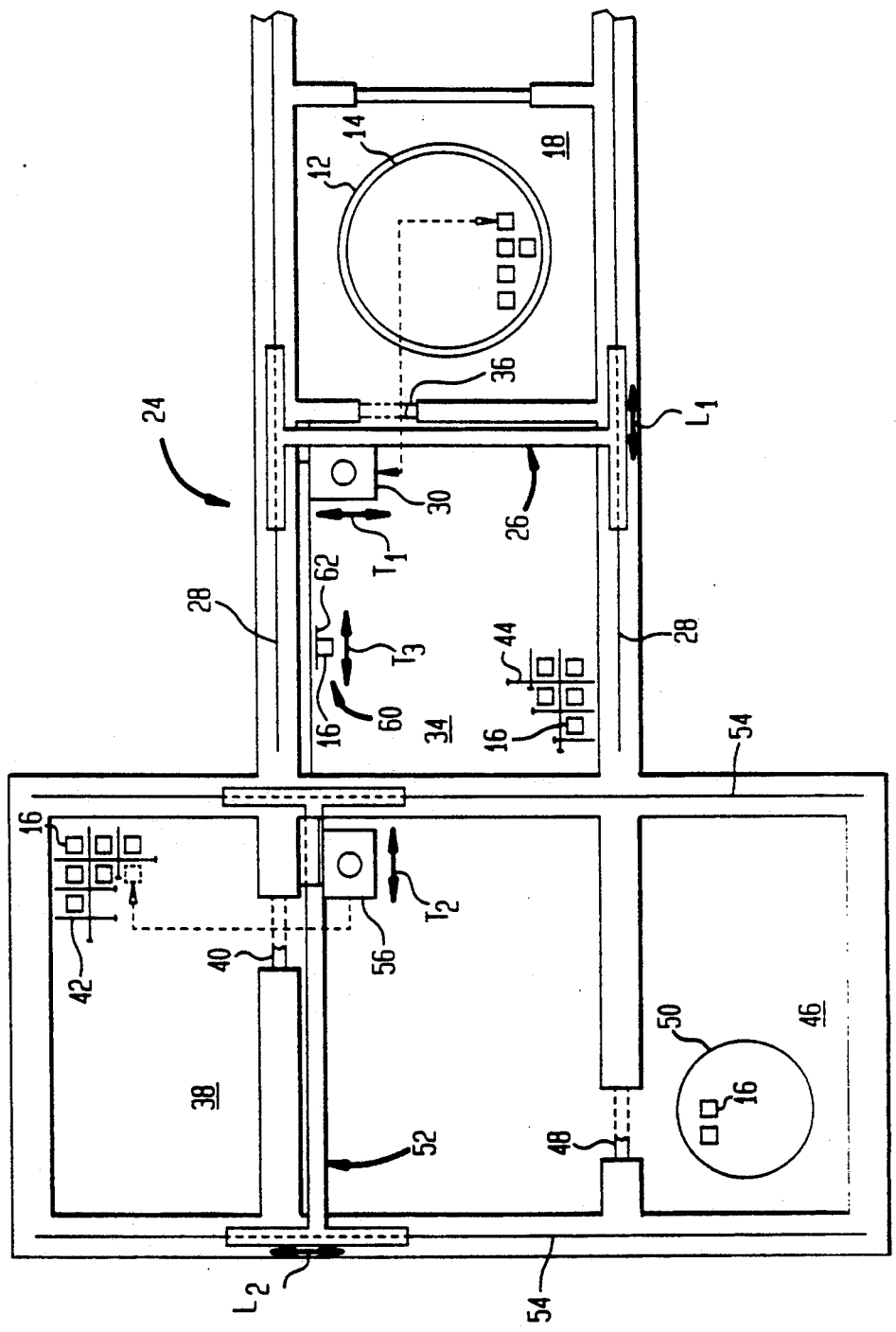
FIG. 2 is a plan view of the fuel transfer system illustrated in FIG. 1 taken along line 2—2.

Illustrated schematically in FIGS. 1 and 2 is an exemplary boiling water reactor plant indicated generally at 10 which includes a conventional boiling water reactor having a pressure vessel 12 and a nuclear reactor core 14 therein. The reactor core 14 includes a plurality of conventional elongate fuel bundles 16 with an exemplary couple thereof being illustrated with it being understood that there are as many as required in a conventional reactor core 14, for example up to about 800 of such fuel bundles 16.

The pressure vessel 12 and the reactor core 14 are disposed in a vertical upright position within the plant 10, and the pressure vessel 12 includes a removable top 12a which is completely removed during a refueling operation for providing access from above to the fuel bundles 16 within the reactor core 14 as is conventionally known. Disposed directly above the reactor core 14 and the pressure vessel 12 is an upper refueling pool 18 which is suitably filled with water 20. A conventional drywell head 22 separates the bottom of the pool 18 from the pressure vessel 12 during operation, but is also completely removed during the refueling operation for providing access to the reactor core 14. During refueling the water 20 completely fills the open pressure vessel 12 up to the top of the upper pool 18.

In accordance with the present invention, a fuel transfer system 24 is provided for transporting the fuel bundles 16 to and from the reactor core 14 during a refueling operation thereof. The system 24 includes a conventional first gantry or bridge 26 which is conventionally selectively translatable over a first pair of bridge tracks 28 longitudinally over the upper pool 18 from one end thereof to an opposite end thereof as shown by the double arrows $L_1$. The first bridge 26 includes a conventional first trolley 30 which is selectively translatable along the first bridge 26 transversely to the upper pool 18 as shown by the double arrows labeled $T_1$. The first trolley 30 includes a conventional selectively telescoping first grapple 32 which is movable vertically upwardly and downwardly as shown by the double arrows $V_1$ in FIG. 1 for lifting an individual fuel bundle 16 to either load it into the reactor core 14 or remove it therefrom. The first bridge 26 including the first trolley 30 and the first grapple 32 are, therefore, effective for transporting the fuel bundles 16 longitudinally ($L_1$), transversely ($T_1$), and vertically ($V_1$) from and to the reactor core 14 and through the upper pool 18.

The system 24 further includes a transfer pool 34 which also contains the water 20 in a common pool with the upper pool 18. More specifically, the transfer pool 34 includes a floor 34a which is common with the floor of the upper pool 18 which is disposed above the reactor core 14. A removable first partition or gate 36 is disposed in a common wall between the pools 18 and 34 and is removable during the refueling operation for providing an access opening between the two pools for passage of the fuel bundles 16. The surface level of the water 20 is common between the two pools 18 and 34 at the tops thereof and is disposed above the reactor core 14 for providing suitable radioactive shielding thereof.

A fuel storage pool 38 shown in more particularity in FIG. 2 is disposed adjacent to the transfer pool 34 and preferably shares the common floor 34a with the transfer pool 34 at an elevation above the reactor core 14 with a common surface level of the water 20 contained therein. The transfer pool 34 is preferably disposed between the upper pool 18 and the fuel storage pool 38.

A portion of the transfer pool 34 extends parallel to the fuel pool 38 and is separated therefrom by a wall including a second selectively removable partition or gate 40 which allows access under water between the two pools. The fuel pool 38 includes a conventional storage rack 42 for temporarily storing spent ones of the fuel bundles 16 therein. Fresh ones of the fuel bundles 16 may be stored in a fresh-fuel rack 44 located in the transfer pool 34. And, a conventional cask pool 46 is preferably disposed adjacent to the one end of the transfer pool 34 on a side opposite to that of the fuel pool 38 with a common wall therebetween including a third selectively removable partition or gate 48 for allowing access between the two pools underwater. The cask pool 46 includes a conventional shipping cask 50 in which spent fuel bundles 16 may be placed for removal from the plant to a long term storage site.

In order to transport the spent fuel bundles 16 between the transfer pool 34 and the fuel storage pool 38 and cask pool 46 on opposite sides thereof, a second conventional gantry or bridge 52 is mounted on a second pair of bridge tracks 54 which extend longitudinally over the fuel storage pool 38, over a portion of the transfer pool 34, and over the cask pool 46. The second bridge tracks 54 are preferably disposed perpendicularly or transversely to the first bridge tracks 28 in a general T-shaped arrangement for providing a compact configuration for improving fuel bundle transport time between the various pools.

The second bridge 52 is conventionally selectively translatable longitudinally along the second tracks 54 as indicated by the double arrows $L_2$ and over the respective pools 38, 34, and 46. The second bridge 52 includes a conventional second trolley 56 which is selectively translatable along the second bridge 52 transversely to the second tracks 54 as indicated by the double arrows $T_2$. Conventionally joined to the second trolley 56 is a conventional, selectively telescoping second grapple 58 which is movable vertically upwardly and downwardly as indicated by the double arrows $V_2$ shown in FIG. 1 for lifting a fuel bundle 16. The second bridge 52 including the second trolley 56 and the second grapple 58 is therefore effective for transporting a fuel bundle 16 longitudinally, transversely, and vertically underwater between the pools 38, 34, and 46 within the range of the second tracks 54. For example, the second bridge 52 is effective for transporting a spent fuel bundle 16 from the transfer pool 34 through the open second gate 40 and into the storage rack 42. And, spent fuel bundles 16 may be transported from the storage rack 42 through the open second gate 40 and through the open third gate 48 and positioned within the shipping cask 50 for being transported to the long term storage site. Similarly, a fresh fuel bundle 16 may be picked up from the fresh-fuel rack 44 and transported by the first bridge 26 through the transfer pool 34 for subsequent delivery to the reactor core 14.

Since the first bridge 26 preferably operates solely over the upper pool 18 and the end of the transfer pool 34 adjacent thereto, and the second bridge 52 operates solely over the fuel storage pool 38, the cask pool 46, and the opposite end of the transfer pool 34, a fuel transfer machine 60 shown generally at 60 in FIGS. 1 and 2 in accordance with an exemplary embodiment of the present invention is provided for transferring the fuel bundles 16 between the first and second bridges 26 and 54.

Figure 3:
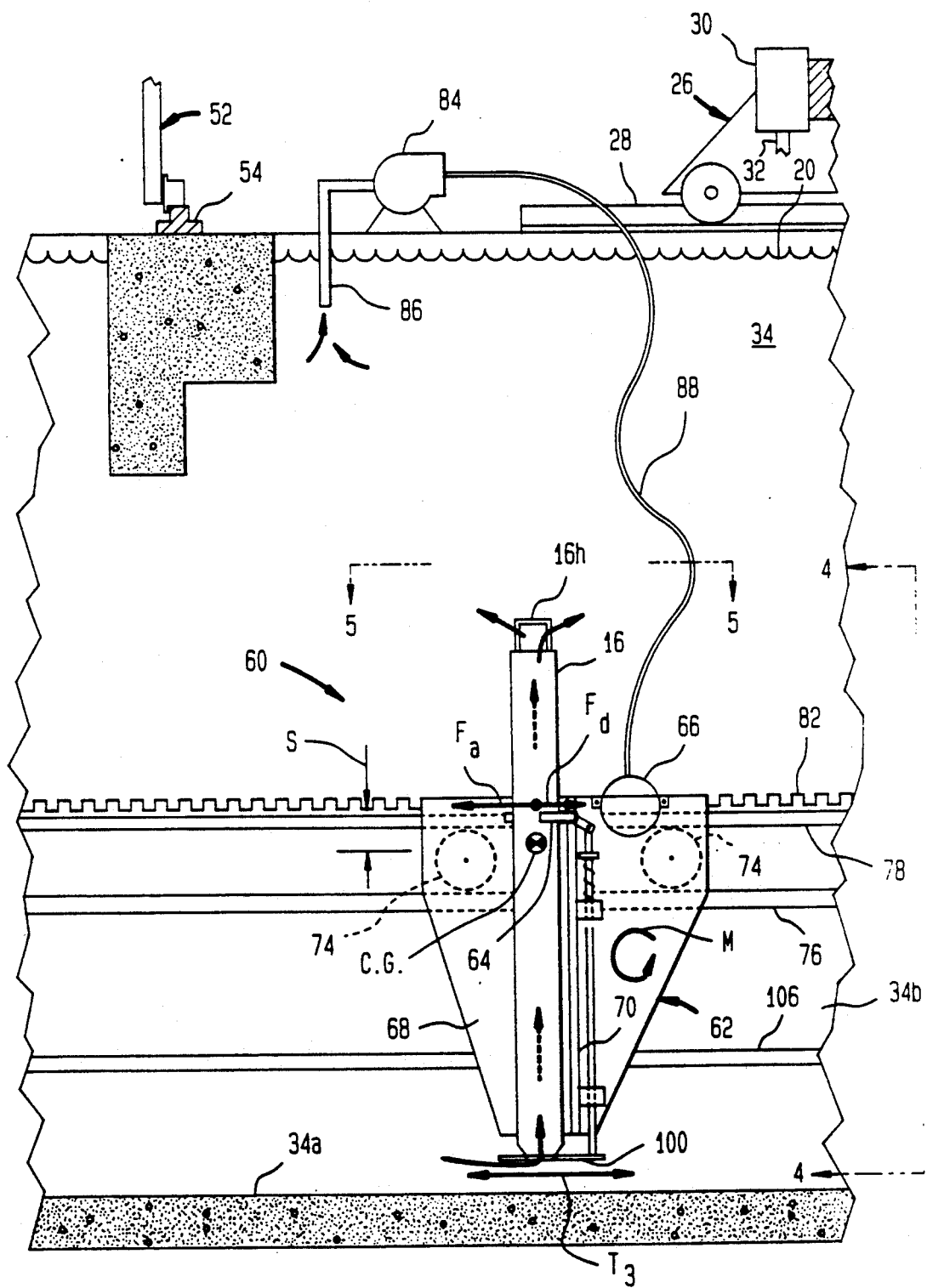
FIG. 3 is an enlarged elevation view of a portion of the fuel transfer system shown in FIG. 1 illustrating a fuel transfer machine in accordance with one embodiment of the present invention.

The fuel transfer machine 60 is illustrated in more particularly in FIG. 3 and includes a chassis or carriage 62 disposed in the transfer pool 34 and under the water 20 adjacent to the pool floor 34a for transporting an individual fuel bundle 16 in the exemplary embodiment illustrated. Means are provided in the exemplary form of a hinged lever or dog 64 for removably holding the fuel bundle 16 vertically in the carriage 62 during transfer. Means including a motor 66 are also provided for selectively moving the carriage 62 through the water 20 in the transfer pool 34 for transferring or transporting the fuel bundles 16 between the first and second bridges 26 and 52.

Figure 4:
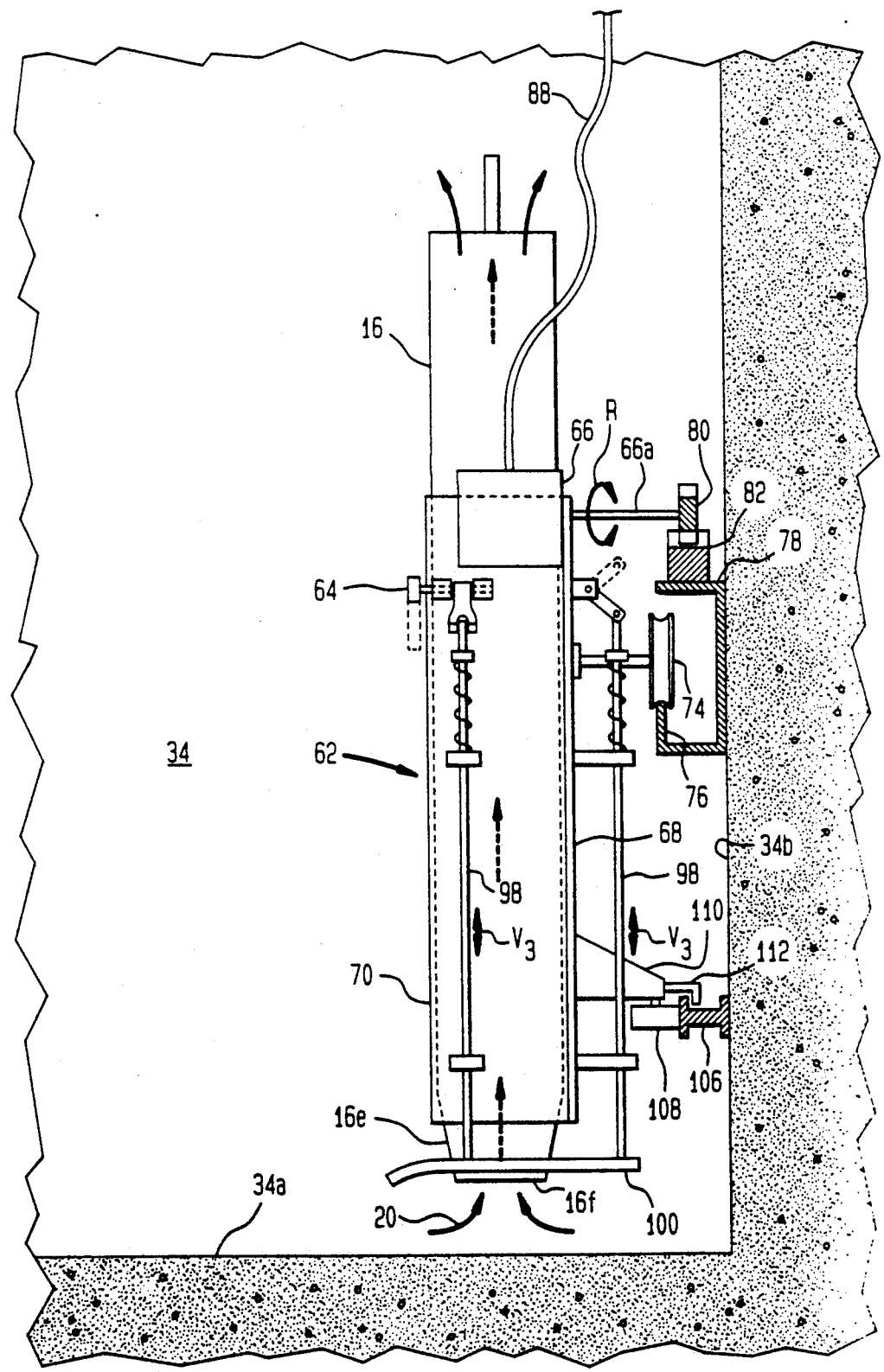
FIG. 4 is a transverse, elevation view of the fuel transfer machine illustrated in FIG. 3 taken along line 4—4.
Figure 5:
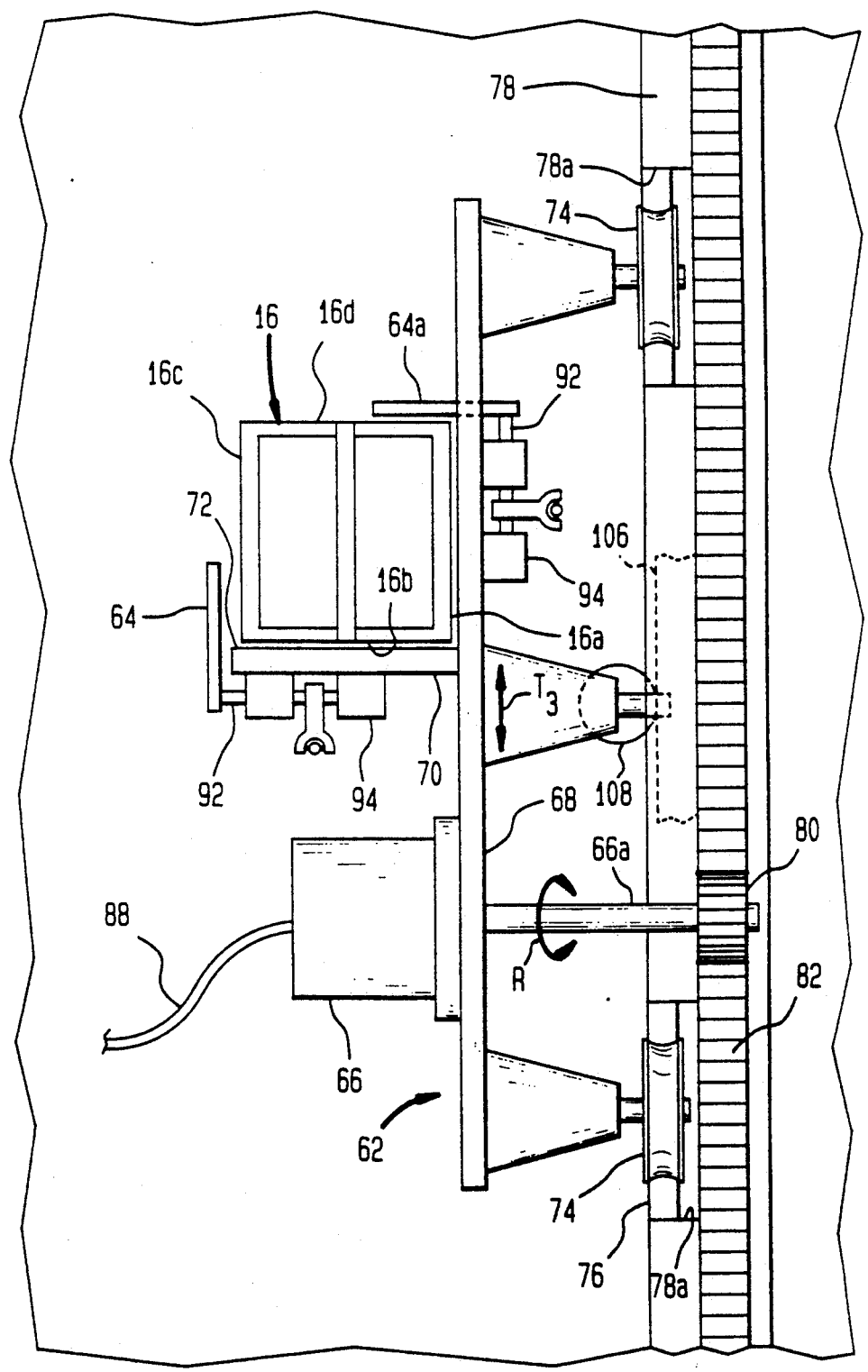
FIG. 5 is a top view of the fuel transfer machine illustrated in FIG. 3 taken along line 5—5.

Referring to FIGS. 3-5, the carriage 62 in an exemplary embodiment includes a vertical frame 68 in the form of a flat plate, and a vertical sidewall 70 also in the form of a plate extending perpendicularly outwardly from the frame 68 and fixedly joined thereto for collectively defining a two-wall basket 72 as shown more particularly in FIG. 5 for collectively supporting the fuel bundle 16 on first and second vertical sides 16a and 16b thereof. By this configuration, the vertical basket 72 is effective for receiving horizontally or laterally or sideways the fuel bundle 16 which may, therefore, always remain in a vertical upright position to ensure effective natural convection cooling thereof.

Figure 6:
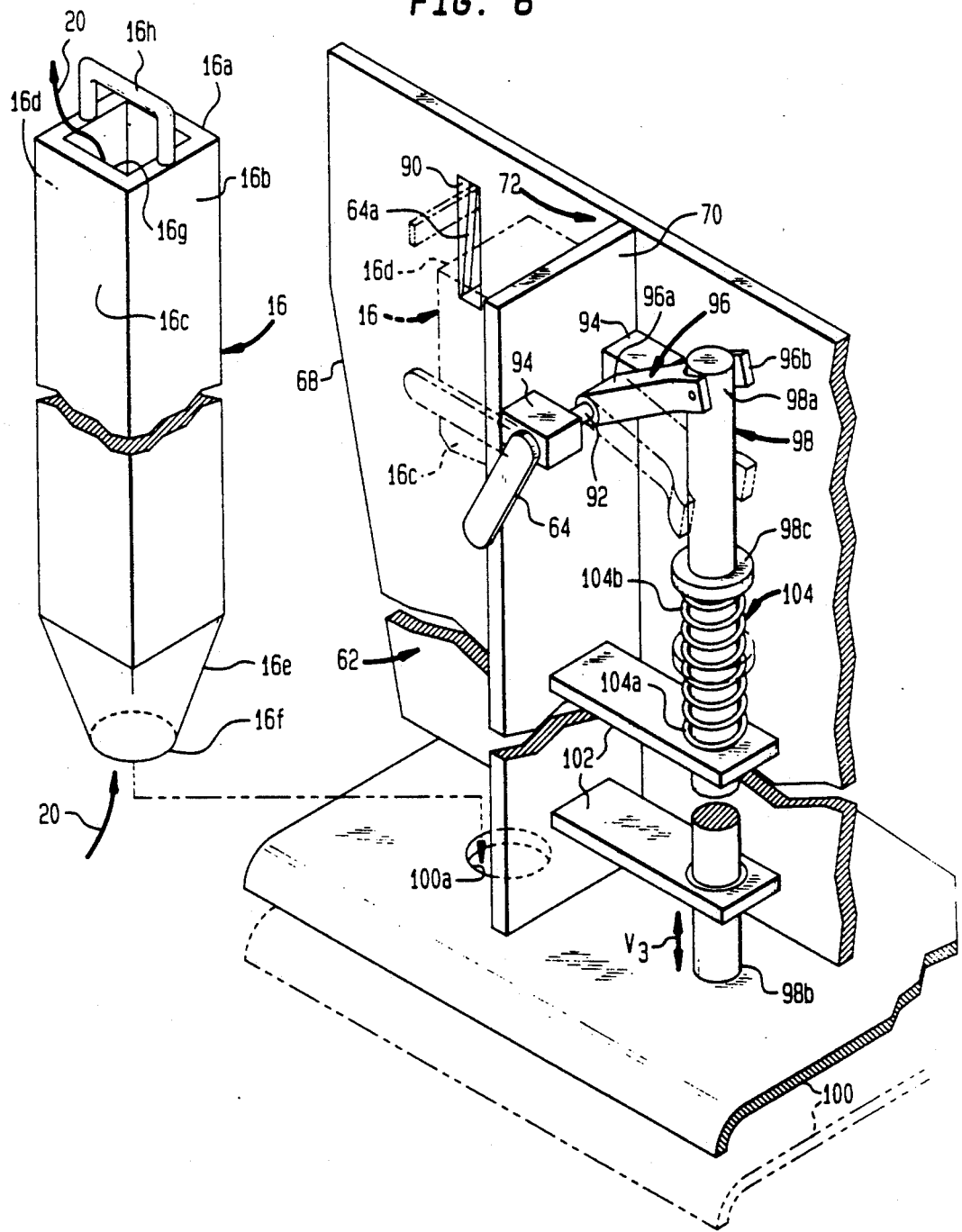
FIG. 6 is a perspective, elevation, partly exploded view of a carriage in the fuel transfer machine illustrated in FIGS. 3-5 for vertically transporting a fuel bundle therein.

More specifically, and referring to FIG. 6, each of the fuel bundles 16 is elongate in the vertical direction and in this exemplary embodiment includes a square, four-sided flow or fuel channel having the first and second sides 16a and 16b and opposite third and fourth sides 16c and 16d. Disposed within the four sides are a plurality of conventional nuclear fuel rods (not shown). A conventional hollow, conical nosepiece 16e is provided at the bottom of the fuel bundle 16 and includes an inlet 16f for receiving the water 20. The water 20 is conventionally allowed to flow upwardly inside each of the fuel bundles 16 for cooling the fuel tubes therein and is discharged from an outlet 16g at the top thereof. A conventional handle 16h is provided for lifting the fuel bundle 16.

During normal operation of the fuel bundles 16 within the reactor core 14 illustrated in FIG. 1, the water in the pressure vessel 12 is channeled upwardly through the fuel bundles 16 and heated by the nuclear reactions taking place within the fuel rods themselves. However, a spent fuel bundle 16 being removed from the reactor core 14 during a refueling operation still generates a small amount of heat which must be suitably dissipated in order to avoid overheating the fuel bundle 16 and thereby causing damage thereto. Accordingly, it is preferred to maintain each fuel bundle 16 continuously in an upright, vertical position as shown in FIG. 6 to allow the water 20 to enter the inlet 16f and flow upwardly through the fuel bundle 16 and exit from the outlet 16g by natural convection. The carriage 62 including the vertical basket 72 supports the fuel bundle 16 in the vertical direction for promoting this natural convection cooling thereof in the preferred embodiment of the invention.

Referring again to FIGS. 3-5, the carriage 62 further includes two horizontally spaced apart vertical support wheels 74 conventionally rotatably joined to the frame 68. A support track 76 is conventionally fixedly mounted to a sidewall 34b of the transfer pool 34 preferably inside the pool 34 under the water 20 and above the pool floor 34a for supporting the two wheels 74 to support the carriage 62. As shown in FIG. 4, the wheels 74 preferably include double flanges which ride along the track 76 and are prevented by the double flanges from moving laterally off the track 76. A first, or top retention flange 78 extends perpendicularly outwardly from the pool sidewall 34b and may be formed integrally with the track 76 as shown in FIG. 4, and is spaced directly above the two support wheels 74 for preventing vertical uncoupling of the support wheels 74 from the track 76, during a seismic event for example. In this way, the carriage 72 is allowed to roll freely longitudinally along the track 76 and cannot be uncoupled either vertically due to the first retention flange 78 or laterally due to the double flange design of the support wheel 74.

In order to propel the carriage 62, the motor 66 is preferably fixedly joined to the top of the carriage frame 68 and includes an output shaft 66a extending therefrom to which is fixedly joined a conventional pinion 80 having conventional gear teeth. The output shaft 66a extends toward the pool sidewall 34b for allowing the pinion 80 to mate with a conventional elongate rack 82 fixedly joined to the pool sidewall 34b by being conventionally joined to the top of the first retention flange 78 for example. The rack 82 extends parallel to the track 76 for its full longitudinal extent so that the rack 82 and the pinion 80 may be operatively joined together by their respective teeth. Rotation of the pinion 80 by the motor 66 in selectively opposite directions of rotation indicated by the double arrow R selectively translates the carriage 62 along the track 76 in the corresponding transverse direction indicated by the double arrows $T_3$ shown in FIG. 5.

In the preferred embodiment illustrated in FIG. 3, the motor 66 is preferably a hydraulic motor powered by pressurized water. A conventional water pump 84 is suitably disposed above the transfer pool 34 for example, and includes an inlet conduit 86 extending into the transfer pool 34 for drawing into the pump 84 a portion of the water 20. A conventional flexible outlet conduit 88 is joined in flow communication between the pump 84 and the motor 66 for providing pressurized water to the pump 66. The outlet conduit 88 has a sufficient length to allow the carriage 62 to travel the full length of the track 76 within the transfer pool 34 and between the first and second bridges 26 and 52. The motor 66 includes conventional valves therein (not shown) which are conventionally operable to channel the pressurized water therein for rotating the output shaft 66a selectively in opposite directions. The outlet conduit 88 may include conventional electrical or other lines extending therealong for controlling operation of the motor 66. In alternate embodiments, any suitable type of motor 66 and control thereof may be used for propelling the carriage 62 along the track 76. The water powered motor 66 is preferred to prevent contamination of the water 20 with any foreign substance such as oil which might be found in other types of conventional motors, and the outlet conduit 88 provides an effective manual means for positioning the carriage 62 in the event of failure of the motor 66, in which event the conduit 88 may be used to manually pull the carriage 62 as desired for positioning the carriage 62.

Referring to FIG. 6, the hinged dog 64 is illustrated in more particularity and is selectively rotatable to capture the fuel bundle 16 in the basket 72 or release the fuel bundle 16 to allow for its unobstructed removal from the basket 72. More specifically, in the preferred embodiment, the basket 72 is defined by the intersection of the sidewall 70 and the frame 68 and extends vertically to allow unobstructed insertion therein of the fuel bundle 16 substantially laterally or sideways. In this way, the fuel bundle 16 may be continuously maintained in its vertical upright position for allowing natural convection cooling thereof as described above, and may be relatively quickly loaded onto the carriage 62. Furthermore, since the fuel bundle 16 may be loaded substantially sideways into the basket 72 the surface level of the water 20 within the transfer pool 34 may be reduced and still provide effective shielding of radiation therefrom. If the fuel bundles 16 were loaded vertically downwardly into the carriage 62, the surface level of the water 20 would necessarily have to be relatively larger to ensure that a sufficient level of water 20 is always maintained above the top of the fuel bundles 16 even when it is temporarily positioned directly above the carriage 62 before being inserted downwardly therein. By instead loading the fuel bundles 16 substantially sideways into the basket 72, the fuel bundles 16 need not be elevated substantially above the carriage 62 and the required additional level of water 20 thereabove is not required. Of course, a lower fuel transfer pool 34 decreases costs of the power plant.

Although the basket 72 could in an alternate embodiment include a second one of the sidewalls 70 to define a generally U-shaped basket 72, in the preferred embodiment, only a single sidewall 70 is preferred to define a generally L-shaped basket 72. In this way, the fuel bundle 16 may be loaded sideways into the basket 72 in substantially two transverse directions perpendicularly toward the frame 68 and perpendicularly toward the sidewall 70 which provides increased freedom of loading without obstruction for improving loading time. The fuel bundle 16 will then be supported on its first and second sides 16a and 16b respectively by the frame 68 and the sidewall 70. In order to prevent the fuel bundle 16 from falling out of the basket 72, a pair of the hinged dogs 64 are preferred, with the first dog designated 64 and the second dog designated 64a. The first and second dogs 64, 64a are substantially identical in configuration and operation with the first dog 64 extending from the sidewall 70 for selectively capturing the fuel bundle third side 16c, and the second dog 64a extending through a complementary aperture 90 near the top of the carriage frame 68 for selectively capturing the fourth side 16d of the fuel bundle 16.

As shown in FIG. 6, the first dog 64, and similarly the second dog 64a, is actuated by a shaft 92 conventionally rotatably joined to the basket sidewall 70 by a pair of support spaced apart blocks 94 preferably disposed near the top thereof. The shaft 92 is fixedly joined to the dog 64 for rotating the dog 64 between an extended position substantially horizontal as shown in phantom line in FIG. 6 for capturing the fuel bundle 16 in the basket 72, and in a retracted, substantially vertical position shown in solid line allowing the fuel bundle 16 to be removed from or installed into the basket 72 substantially horizontally without obstruction. The dogs 64, 64a need only extend in the horizontal direction a relatively short distance to prevent the fuel bundle 16 from falling sideways out of the basket 72.

As shown in FIG. 6, a lever 96 has a proximal end 96a fixedly joined to the shaft 92 between the blocks 94 and has an opposite, distal end 96b in the exemplary form of a clevis. A vertical latch rod 98 has a top, distal end 98a which is conventionally pivotably joined to the level distal end 96b, and includes a bottom, proximal end 98b fixedly joined to a generally rectangular base plate 100. The base plate 100 is disposed below the basket sidewall 70 for supporting the bottom nosepiece 16e of the fuel bundle 16. The base plate 100 preferably includes an inlet aperture 100a therethrough which is sized for receiving the inlet 16f of the fuel bundle nosepiece 16e in flow communication therewith when the fuel bundle 16 is carried in the basket 72. This allows the water 20 from the pool 34 to flow vertically upwardly through the fuel bundle 16 for the cooling thereof during transport in the carriage 62.

As shown in FIG. 4, the two latch rods 98 are fixedly joined to the base plate 100 for supporting the base plate 100 and the fuel bundle 16 to the frame 68. Referring again to FIG. 6, a vertically spaced pair of second support blocks 102 extend perpendicularly outwardly from the basket sidewall 70 and include respective apertures therethrough which vertically support the latch rod 98 for allowing vertical movement therethrough. A compression spring 104 is disposed in this exemplary embodiment around the rod 98 and is fixedly supported at a bottom, proximal end 104a to the top one of the support blocks 104 which is in turn fixedly supported to the basket sidewall 70. The spring 104 is also fixedly supported at an opposite top, distal end 104b to the rod 98 by annular flange 98c thereof. By this arrangement, the springs 104 around the two latch rods 98 are initially compressed for supporting the empty weight of the base plate 100. The springs 104 are predeterminedly sized so that placement of a fuel bundle 16 in the basket 72 and on the base plate 100 translates the rod 98 slightly downwardly to further load the springs 104, and in turn positions the dogs 64, 64a from their retracted positions to their extended positions. And, in order to remove the fuel bundle 16, it is initially lifted slightly upwardly for removing its weight from the base plate 100 which allows the springs 104 to unload and translate upwardly the rods 98 which positions the dogs 64, 64a in their retracted position for removing the fuel bundle 16 laterally without obstruction by the dogs 64, 64a.

The fuel transfer system 24 provides improved operation for transferring the fuel bundles 16 between the reactor core 14 and the fuel storage pool 38. For example, as illustrated in FIGS. 1, 2 and 6, the first bridge 26 is conventionally operable to selectively unload one of the spent fuel bundles 16 from the reactor core 14 and transport it from the upper pool 18 through the open gate 36 to the transfer pool 34. The carriage 62 is selectively positioned to the end of the track 76 adjacent to the upper pool 18 so that the first bridge 26 may be operated to selectively load the fuel bundle 16 laterally into the basket 72 illustrated in FIG. 6. The fuel bundle 16 is preferably loaded generally diagonally and horizontally into the basket 72 between the frame 68 and the sidewall 70 slightly above the base plate 100 and is then translated downwardly so that the nosepiece 16e enters the base plate aperture 100a. As the weight of the fuel bundle 16 is applied downwardly on the base plate 100, the two latch rods 98 compress the springs 104 which rotate the two dogs 64, 64a into their extended positions for capturing the fuel bundle 16 within the basket 72. The motor 66 is then selectively operated to transport the carriage 62 horizontally along the track 76 to its opposite end adjacent to the fuel storage pool 38. The second bridge 52 is conventionally operated so that the second grapple 58 is joined to the fuel bundle handle 16h to initially lift it vertically within the basket 72 to unload the base plate 100 which allows the compression springs 104 to unload and urge the dogs 64, 64a into their retracted positions. The second bridge 52 then removes the fuel bundle 16 laterally from the basket 72 and transports it through the open second gate 40 into fuel storage pool 38 where it is conventionally placed in the storage rack 42.

A fresh fuel bundle 16 is conventionally removed from the fresh-fuel rack 44 by the first bridge 26. The first bridge 26 then transports the fresh fuel bundle 16 through the open first gate 36 and into the upper pool 18 wherein it is transported downwardly into position within the reactor core 14.

Since loading and unloading fuel bundles 16 within the reactor core 14 is a relatively slow process, the timing of travel of the first bridge 26 on the first tracks 28, travel of the carriage 62 on the track 76, and travel of the second bridge 52 on the second track 54 to the storage rack 42 may be coordinated for transporting the fuel bundles 16 therebetween for reducing the overall time of the refueling operation. For example, a spent fuel bundle 16 may be transported by the carriage 62 from the first bridge 26 to the second bridge 52, with the empty carriage 62 returning to meet the first bridge 26 in about the same time that it takes the first bridge 26 to return from the reactor core 14 with another spent fuel bundle 16. Similarly, the second bridge 52 can complete a cycle of operation by delivering a spent fuel bundle 16 to the storage rack 42 from the carriage 62 and return thereto in time to pick up the next spent fuel bundle 16 delivered by the carriage 62. If desired, the first bridge 26 may also pick up a fresh fuel bundle 16 from the rack 44 after delivering a spent fuel bundle 16 to the carriage 62 and deliver it to the reactor core 14 prior to picking up another spent fuel bundle 16.

In a preferred embodiment of the present invention, two identical fuel transfer machines 60 are located coextensively parallel to each other (as represented schematically by the single machine 60 illustrated in FIG. 2) for further decreasing the time of refueling and for providing redundancy. Each of the fuel transfer machines 60 may be used to separately carry a spent fuel bundle 16 from the first bridge 26 to the second bridge 52 for decreasing overall refueling time. Accordingly, the second bridge 52 may be used to unload a spent fuel bundle 16 from the first transfer machine 60, place it in the storage rack 42, and return to the second transfer machine 60 to pick up another spent fuel bundle 16 as the first transfer machine 60 is picking up another spent fuel bundle 16 from the first bridge 26.

The fuel transfer machine 60, therefore, improves the overall refueling operation including reducing the overall time required for refueling, while continuously maintaining each fuel bundle 16 in an upright position for allowing natural convection cooling thereof with a reduced requirement for shielding water 20 above the fuel bundle 16 as above described.

To further reduce the required level of shielding water 20 above the fuel bundle 16 being transported in the carriage 62 as shown in FIG. 3, for example, the carriage 62 is preferably located relatively close to the pool floor 34a but spaced thereabove. Since radioactive corrosion debris will typically be dislodged from the spent fuel bundles 16 being transported by the carriage 62, it is preferred to keep the pool floor 34a unobstructed so that such debris may simply fall thereto and be readily cleaned up by conventional means. Since the carriage 62 is mounted to the pool sidewall 34b above the floor 34a the components thereof avoid any obstruction of the cleaning process. And, by locating the carriage 62 relatively closely to the pool floor 34a, the height of the shielding water 20 above the fuel bundles 16 may be reduced as above described.

Since the carriage 62 and the fuel bundle 16 transported therein are traveling under the water 20, they are subject to drag forces which have a resultant drag force designated $F_d$ shown in FIG. 3 as extending to the right when the carriage 62 is moving to the left. The resultant driving force applied by the motor 56 to the rack 82 for moving the carriage 62 under the water 20 is designated by the arrow labeled $F_a$ extending to the left in FIG. 3. If the applied force $F_a$ and the drag force $F_d$ are spaced apart vertically, a turning moment M will be generated which will tend to rotate or pitch the carriage 62 about an axis extending perpendicularly outwardly from the pool sidewall 34b which will tend to tilt the carriage 62 and the fuel bundle 16. In order to reduce or eliminate this turning moment M, the application of the driving force $F_a$ by the motor 66 on the rack 82 is selected to be substantially at the same vertical plane as the resultant drag force $F_d$. In the preferred embodiment, this may be accomplished by locating the center of gravity designated C.G. of the combined carriage 62 and the fuel bundle 16 being transported therein preferably as close as possible to the rack 82 at a vertical spacing S which is as small as possible. Furthermore, the track 76 and the wheels 74 are also located as close as possible to the rack 82 and the center of gravity for reducing the rotational moment M as the carriage 62 is transported under the water 20. In this way, the tendency for the carriage 62 and the fuel bundle 16 to pitch or tilt during transport is reduced, and lifting of one of the wheels 74 from the track 76 is prevented for more effective operation of the carriage 62.

With the center of gravity being preferably located relatively close to the rack 82, near the top of the carriage 62, the preferred embodiment of the present invention also includes a guide rail 106 as shown in FIGS. 3 and 4 fixedly joined to the pool sidewall 34b and spaced parallel to and vertically below the support track 76 near the bottom end of the carriage 62. A horizontally disposed guide wheel 108 as shown in FIG. 4 is conventionally rotatably joined to the carriage frame 68 by a support 110, and preferably below the two support wheels 74. The guide wheel 108 is disposed in rolling contact with the guide rail 106 for preventing roll-rotation of the carriage 62 about the track 76. Since the center of gravity is preferably relatively high and is located near the support wheels 74, the bottom of the carriage 62 could otherwise move laterally to the left or to the right as illustrated in FIG. 4 without the guide rail 106. The guide wheel 108 prevents counterclockwise rotation movement to the right, and clockwise rotation movement to the left is prevented by a second retention flange 112 extending from the support 110 on the carriage frame 68 toward the pool sidewall 34b. The second flange 112 is predeterminedly spaced from the guide rail 106 for preventing excessive uncoupling of the guide wheel 108 laterally from the guide rail 106. As shown in FIG. 4, the guide rail 106 is preferably T-shaped under the guide wheel 108, and the second retention flange 112 is L-shaped and cooperates with one side of the guide rail 106 for preventing the guide wheel 108 from moving excessively away from the other side of the guide rail 106.

In order to remove the carriage 62 from the track 76 and the guide rail 106 for performing maintenance thereof, the first retention flange 76 as shown in FIG. 5 includes two longitudinally spaced apart cutouts 78a sized for allowing the carriage 62 to be lifted off the track 74 with the support wheels 74 passing upwardly through the cutouts 78a without obstruction. As shown in FIG. 4, the second retention flange 112 is preferably disposed above the guide rail 106 so that the second retention flange 112 and the guide wheel 108 may also be lifted away from the guide rail 106 for removing upwardly the carriage 62. The two cutouts 78a illustrated in FIG. 5 may be disposed at any desired location along the first retention flange 78 such as at any of the two opposite ends thereof. The carriage 62 may, therefore, be lifted off the track 76 and rail 106 and removed from the transfer pool 34 for conducting maintenance outside of the water 20.

The fuel transfer system 24 described above increases overall speed of performing a refueling operation by utilizing the fuel transfer machine 60 between the first and second bridges 26 and 52 and coordinating the operation thereof. The fuel bundles 16 are transported solely in their vertical, upright positions for continuously allowing natural convection cooling thereof by the water 20 channeled upwardly therethrough. And, the side loading and unloading of a fuel bundle 16 into the basket 72 further improves the speed of operation by decreasing the degree of difficulty of loading and unloading fuel bundles therein, and reduces the required depth of the transfer pool 34 for providing effective shielding above the transported fuel bundle 16. Accordingly, conventional horizontal or inclined transfer tubes are not required in this design nor are the conventionally required upending devices. By mounting the carriage 62 to the pool sidewall 34b, the pool floor 34a is kept unobstructed for allowing improved cleanup of any radioactive corrosion debris settling thereto by conventional cleanup apparatus. Furthermore, the sidewall mounted carriage 62 allows for relatively easy removal therefrom for maintenance thereof removed from the transfer pool 34.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A system to transfer a nuclear fuel bundle from and to a reactor core comprising:
   a transfer pool having a sidewall and a floor, and containing water having a surface level disposed above said reactor core;
   a carriage disposed in said transfer pool and under said water for transporting said fuel bundle;
   means for removably holding said fuel bundle vertically in said carriage; and
   means for selectively moving said carriage through said water in said transfer pool;
   said carriage including a vertical frame, a vertical basket for receiving said fuel bundle, and two horizontally spaced apart support wheels rotatably joined to said frame;

said holding means including a hinged dog selectively rotatable to capture said fuel bundle in said basket; and said moving means including a track fixedly mounted to said transfer pool sidewall above said pool for supporting said two support wheels to support said carriage, and a motor operatively joined between said carriage and said track for selectively propelling said carriage along said track.

2. A fuel transfer system according to claim 1 wherein said moving means further comprise:

said motor being fixedly joined to said carriage frame;

a pinion fixedly joined to an output shaft extending from said motor toward said transfer pool sidewall; and a rack fixedly joined to said sidewall and extending parallel to said track, said rack and pinion being operatively joined together so that rotation of said pinion by said motor translates said carriage along said track.

3. A fuel transfer system according to claim 2 wherein said moving means further comprise a water pump joined in flow communication with said motor for providing selectively pressurized water thereto; and wherein said motor is a hydraulic motor powered by said pressurized water.

4. A fuel transfer system according to claim 3 further comprising:

a guide rail fixedly joined to said transfer pool sidewall, and spaced vertically from said track and parallel thereto; and a guide wheel rotatably joined to said carriage frame in rolling contact with said guide rail for preventing roll-rotation of said carriage about said track.

5. A fuel transfer system according to claim 4 further comprising:

a first retention flange extending from said transfer pool sidewall and spaced above said two support wheels for preventing uncoupling of said support wheels from said track;

a second retention flange extending from said carriage frame and spaced from said guide rail for preventing uncoupling of said guide wheel from said guide rail.

6. A fuel transfer system according to claim 5 wherein said first retention flange includes two spaced apart cutouts sized for allowing said carriage to be lifted off said track with said support wheels passing upwardly through said cutouts without obstruction.

7. A fuel transfer system according to claim 1 wherein:

said basket is defined by a vertical sidewall extending outwardly from said frame for collectively supporting said fuel bundle on first and second vertical sides thereof, and further includes a movable base plate disposed below said basket sidewall for supporting a bottom of said fuel bundle; and said hinged dog extends from said basket sidewall for selectively capturing a third vertical side of said fuel bundle.

8. A fuel transfer system according to claim 7 wherein said holding means further comprise:

a shaft rotatably joined to said basket sidewall adjacent to a top thereof, said shaft being fixedly joined to said dog for rotating said dog between an extended position capturing said fuel bundle in said basket and a retracted position allowing said fuel bundle to be removed from and installed into said basket horizontally without obstruction;

a lever fixedly joined at a proximal end to said shaft, and having an opposite distal end;

a vertical rod having a distal end pivotably joined to said lever distal end, and a proximal end fixedly joined to said base plate for supporting said base plate; and a spring disposed around said rod and fixedly supported at a proximal end to said basket sidewall and fixedly supported at an opposite distal end to said rod, said spring being sized so that placement of said fuel bundle in said basket and on said base plate translates said rod to load said spring and positions said dog to said extended position, and removal of said fuel bundle from said basket allows said spring to translate said rod to unload said spring and positions said dog to said retracted position.

9. A fuel transfer system according to claim 8 wherein said holding means include a pair of said hinged dogs including a first dog extending from said basket sidewall for selectively capturing said fuel bundle third side, and a second dog extending from said carriage frame for selectively capturing a fourth vertical side of said fuel bundle, said fourth side extending from said third side to said first side and being disposed oppositely to said second side.

10. A fuel transfer system according to claim 7 wherein said base plate includes an inlet aperture therethrough disposed in flow communication with said fuel bundle bottom when said fuel bundle is carried in said basket for allowing water from said transfer pool to flow vertically upwardly through said fuel bundle for cooling thereof.

11. A fuel transfer system according to claim 1 further including:

an upper pool disposed directly above said reactor core and adjacent to said transfer pool;

a fuel pool disposed above said reactor core and adjacent to said transfer pool, said transfer pool being disposed between said upper pool and said fuel pool;

a first bridge selectively translatable longitudinally over said upper pool, and including a first trolley selectively translatable along said first bridge transversely to said upper pool, said first trolley including a selectively telescoping first grapple for lifting said fuel bundle and transporting said fuel bundle longitudinally, transversely, and vertically between said transfer pool and said reactor core in said upper pool;

a second bridge selectively translatable longitudinally over said fuel pool, and including a second trolley selectively translatable along said second bridge transversely to said fuel pool, said second trolley including a selectively telescoping second grapple for lifting said fuel bundle and transporting said fuel bundle longitudinally, transversely, and vertically between said transfer pool and said fuel pool;

said first bridge being operable to selectively load in and unload from said carriage basket said fuel bundle;

said fuel transfer machine being operable to transport said fuel bundle in said carriage basket in said transfer pool; and said second bridge being operable to selectively load in and unload from said carriage basket said fuel bundle.

12. A system for transferring nuclear fuel bundles from and to a reactor core comprising:
   a transfer pool having a side wall and a floor and containing water having a surface level disposed above the reactor core;
   a carriage disposed in said transfer pool and under said water for transferring the fuel bundle;
   means carried by said carriage for removably holding the fuel bundle in a vertical orientation as the fuel bundle is transported;
   means for selectively moving said carriage through said water in said transfer pool with the fuel bundle maintained in said vertical orientation by said carriage; and
   means carried by said carriage for enabling loading or unloading of the fuel bundle in a generally horizontal direction relative to the carriage with the fuel bundle maintained vertically during transport and loading or unloading relative to the carriage.

13. A system according to claim 12 wherein said holding means includes an element responsive to placement of the fuel bundle on the carriage for holding the fuel bundle on the carriage.

14. A system according to claim 12 wherein said holding means includes an element responsive to the removal of the fuel bundle from the carriage to release the fuel bundle for unloading from the carriage.

15. A system according to claim 12 wherein said holding means includes an element responsive to the weight of the fuel bundle on the carriage for holding the fuel bundle on the carriage.

16. A system according to claim 12 wherein said holding means includes an element responsive to the removal of the weight of the fuel bundle from the carriage to release the fuel bundle for unloading from the carriage.

17. A system according to claim 12 wherein said carriage includes a base having at least one opening for flowing water vertically upwardly into and through the fuel bundle as the fuel bundle is transported by the carriage.

18. A system according to claim 12 wherein said holding means includes an element responsive to the placement and removal of the fuel bundle relative to the carriage for respectively holding and releasing the fuel bundle relative to the carriage, said carriage including a base having at least one opening for flowing water vertically upwardly into and through the fuel bundle as the fuel bundle is transported by the carriage.

* * * * *